May 15, 1962   E. M. HONEYCUTT   3,034,980
PROCESS FOR REMOVING NAPHTHENIC ACIDS FROM HYDROCARBONS
Filed July 15, 1957
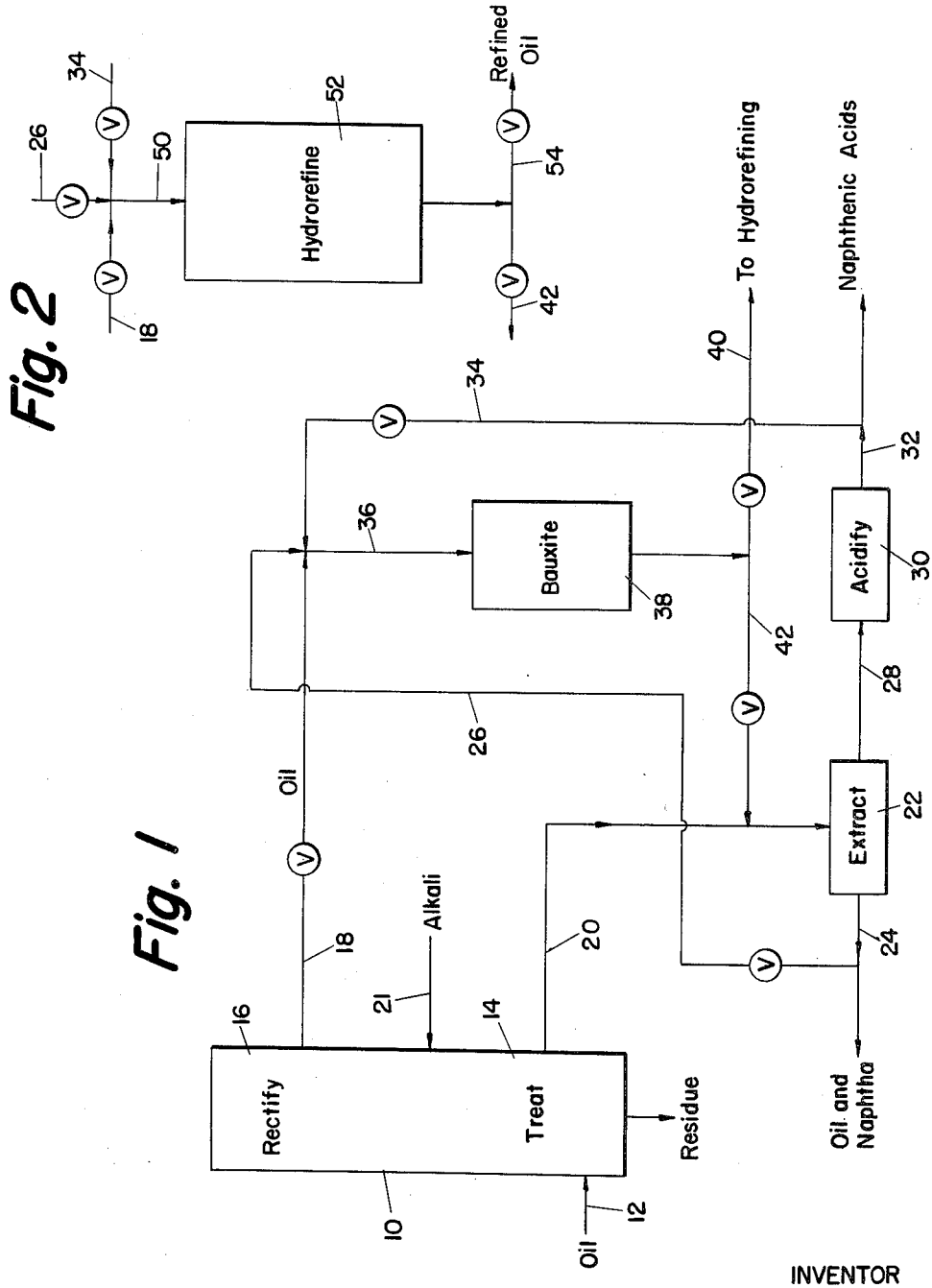
INVENTOR
EARL M. HONEYCUTT
BY
Robert O. Spindle
ATTORNEY United States Patent Office 3,034,980
Patented May 15, 1962

3,034,980
PROCESS FOR REMOVING NAPHTHENIC ACIDS FROM HYDROCARBONS
Earl M. Honeycutt, West Chester, Pa., assignor to Sun Oil Company, Philadelphia, Pa., a corporation of New Jersey
Filed July 15, 1957, Ser. No. 672,068
3 Claims. (Cl. 208—253)

This invention relates to the reactivation of adsorbent materials, including catalysts having adsorbent qualities, which have been employed in the treatment of hydrocarbon oil containing alkali metal compounds.

In the refining of petroleum hydrocarbons, it frequently occurs that hydrocarbon fractions containing alkali metal compounds are contacted with solid granular material having adsorbent properties. In some instances, the contacting with adsorbent is performed for the principal purpose of removing the alkali metal compounds, which may be alkali metal naphthenates or other alkali compounds, e.g. alkali metal hydroxides, from the hydrocarbon fraction. In other instances, the contacting is performed primarily for some other purpose, for example the hydrogenation of components of the hydrocarbon fraction by contact with a solid hydrogenation catalyst having adsorbent properties, and the removal of the alkali metal compounds from the fraction by the catalyst is performed simultaneously with the desired hydrogenation or other conversion.

The accumulation of alkali metal compounds in the adsorbent material in operation as described above eventually results in degradation of the adsorbent for the intended purpose, whether that purpose is primarily the removal of the alkali metal compounds or some other purpose. The present invention provides a novel manner of reactivating adsorbent materials which have been degraded in this manner.

This invention is particularly useful as applied to plants wherein naphthenic acids naturally occurring in petroleum are neutralized as part of a system for recovery of naphthenic acids from the oil. Naphthenic acids, a product which is available in such systems, are employed in the reactivation process according to the invention.

The process according to the invention usually involves contacting the adsorbent material containing alkali metal compounds with free naphthenic acids at a temperature not substantially greater than 250° F. or 300° F., and preferably in the approximate range from 100 to 150° F. Temperatures as low as room temperature can be employed if desired, though it is preferred to employ elevated temperature. The process comprising contacting with naphthenic acids provides highly satisfactory removal of the alkali metal compounds from the adsorbent. It is believed that the naphthenic acids react with alkali metal oxides contained in the adsorbent, thereby to form alkali metal naphthenates. The latter are washed out of the adsorbent by any suitable means, preferably by means of a hydrocarbon washing liquid.

It is believed that alkali metal oxides are formed during the contact of hydrocarbons containing alkali metal compounds with adsorbent material at a temperature for example within the approximate range from 400° F. to 700° F., at which temperature alkali metal compounds, e.g. alkali metal naphthenates, are decomposed to form alkali metal oxides. It is further believed that, in the reactivation method according to the invention, performed at lower temperatures at which alkali metal naphthenates are stable, the naphthenic acids react with the alkali metal oxide to produce alkali metal naphthenates which can be readily washed out of the adsorbent.

The invention will be further described with reference to the attached drawing, wherein FIGURE 1 is a schematic flowsheet illustrating one embodiment of the invention, wherein bauxite which has been employed primarily for the removal of alkali metal compounds from hydrocarbons is reactivated by the process according to the invention, and wherein FIGURE 2 is a schematic flowsheet illustrating the application of the process in the reactivation of a hydrogenation catalyst which has been employed primarily for the hydrorefining of petroleum containing alkali metal compounds.

Referring to FIGURE 1, heavy petroleum oil, e.g. a reduced naphthenic crude, is introduced through line 12 into tower 10. In the lower portion of tower 10, a temperature for example of 700° F. and subatmospheric pressure for example of 75 mm. of Hg absolute are maintained. Vapors evolved from the reduced crude are passed upwardly through zone 14 in tower 10. In this zone, the vapors are contacted with a liquid alkaline treating agent comprising liquid mineral oil, sodium naphthenates, and sodium hydroxide. The sodium hydroxide reacts with naphthenic acids in the rising vapors to form sodium naphthenates which become incorporated in the liquid treating agent. This manner of operation is described in more detail in Earl M. Honeycutt and Curtiss C. Wallin Patent No. 2,770,580 issued November 13, 1956, and Ivor W. Mills Patent No. 2,789,081 issued April 16, 1957.

The vapors which have been contacted with the liquid treating agent are passed upwardly into zone 16 of tower 10, wherein they are rectified to produce various distillate fractions which are removed through line 18 and other means not shown. A heavy distillate fraction, e.g. the heaviest distillate fraction, obtained in zone 16 is removed through line 18.

The liquid alkaline treating agent is removed through line 20 from a lower portion of zone 14. A portion of the removed treating agent is recycled through means not shown to an upper portion of zone 14. Fresh sodium hydroxide to replace that reacted with naphthenic acids is supplied through line 21. The remainder of the treating agent is introduced into extraction zone 22, wherein it is contacted with aqueous isopropanol and petroleum naphtha introduced through means not shown. The naphtha selectively dissolves the oil in the treating agent, and the aqueous alcohol selectively dissolves the alkali metal naphthenates therein. The solution of oil in naphtha is withdrawn through line 24, and during one period of operation, at least a portion thereof is passed through line 26 for further use in a manner which will be more fully described subsequently. If desired, another portion of the solution can be distilled to remove naphtha, and the oil residue re-introduced into tower 10 in the manner described in the Honeycutt and Wallin patent referred to previously.

The solution of alkali metal naphthenates in aqueous alcohol is removed from zone 22 through line 28 and introduced into acidification zone 30, wherein it is contacted with sulfuric acid introduced through means not shown. The sulfuric acid reacts with the sodium naphthenates to form free naphthenic acids and an aqueous salt solution. The naphthenic acids are separated from the aqueous solution and withdrawn through line 32. The aqueous solution is withdrawn through means not shown. At least a portion of the removed naphthenic acids is, during one period of operation, passed through line 34 for further use in a manner more fully described subsequently.

The oil withdrawn through line 18 is introduced through line 36 into zone 38 wherein it is contacted with a stationary bed of granular bauxite in order to remove small amounts of sodium naphthenates entrained with the oil vapors in zone 14 and incorporated in the condensate removed through line 18. Such contacting with bauxite is described in more detail in the Mills patent referred to previously. The oil from which the sodium compounds, e.g. sodium naphthenate, sodium hydroxide, etc., have been removed, is in one embodiment passed through line 40 to a hydrorefining zone, wherein it is contacted with hyrrogen in the presence of a solid hydrogenation catalyst in order to improve the color and color stability and other properties of the oil.

As the contacting of oil with bauxite in zone 38 continues, the amount of alkali metal compounds in the bauxite increases until the bauxite has been degraded to the extent that it must be reactivated. The introduction of oil through lines 18 and 36 into zone 38 is then terminated, and naphthenic acids, oil and naphtha are introduced into zone 38 through lines 26, 34 and 36. Naphthenic acids from any other suitable source can be employed. The naphthenic acids react with sodium hydroxide in the bauxite bed to form sodium naphthenates, and the latter are removed with the effluent from the bauxite bed. This effluent is passed through line 42 into extraction zone 22, wherein the alkali metal naphthenates are separated from the oil and naphtha in the manner described previously. During the period when the bed 38 is being reactivated in this manner, the oil in line 18 can be temporarily stored or passed through another bauxite bed, or handled in any other suitable manner.

When the bauxite has been sufficiently reduced in content of alkali metal compounds, the contacting of the bed with naphthenic acids, oil and naphtha is terminated, and oil from tower 10 is again introduced through lines 18 and 36 into the bauxite bed.

Referring now to FIGURE 2, oil removed from tower 10 through line 18 is passed directly through line 50 into hydrorefining zone 52, rather than being contacted previously with bauxite as shown in FIGURE 1. The hydrorefined oil is withdrawn through line 54. The hydrorefining in zone 52 is performed in the presence of hydrogen introduced through means not shown. During the hydrorefining operation, the alkali metal compounds in the oil introduced through line 18 are removed by contact with the solid hydrogenation catalyst, which comprises an adsorbent carrier such as clay or bauxite, etc. When the amount of alkali metal compounds in the catalyst has degraded the catalyst to the extent that it must be reactivated, the introduction of oil through line 18 is terminated, and the introduction of naphthenic acids, naphtha and oil through lines 26 and 34 is begun. The conditions of contacting are generally similar to those described in connection with FIGURE 1, and the effluent containing sodium naphthenates is withdrawn through line 42 and introduced into the extraction zone 22 in the manner illustrated in FIGURE 1. When the hydrogenation catalyst has been sufficiently reduced in content of sodium compounds, the contacting with naphthenic acids, naphtha and oil is discontinued, and the contacting of oil introduced through line 18 is resumed.

The following examples illustrate the invention:

*Example I*

Operation generally similar to that illustrated in FIGURE 1 is carried out. The liquid alkaline treating agent withdrawn through line 20 contains about 90% oil, 8.5% sodium naphthenates and 1.5% sodium hydroxide. In zone 22, it is contacted with about 75 volumes of petroleum naphtha per 100 volumes of treating agent and with about 125 volumes of 40% aqueous isopropanol per 100 volumes of treating agent. The aqueous alcohol layer is separated from the naphtha layer at about 120° F. The oil withdrawn through line 18 has Saybolt Universal viscosity at 210° F. of about 130 seconds and contains 50 p.p.m. of sodium in the form of sodium compounds such as naphthenates, hydroxide, etc. This oil is contacted with a bed of 10 to 20 mesh bauxite at about 550° F. at a liquid hourly space velocity of about 2 volumes of oil per volume of catalyst bed per hour.

After about 10,000 barrels of oil per ton of bauxite have been treated, the introduction of oil into contact with the bauxite is terminated, and the latter contacted with a treating agent comprising about 40% naphtha, 50% oil, and 10% naphthenic acids. The temperature in the reactivation step is about 150° F. and the liquid hourly spaced velocity about one. After 24 hours, the contact with the reactivating medium is terminated, and the contact with oil containing sodium compounds resumed.

The reactivation is sufficient to reduce the sodium content of the bauxite to a satisfactorily low level, permitting the further use of the bauxite to treat large amounts of additional oil for removal of sodium compounds therefrom.

*Example II*

Operation generally similar to that illustrated in FIGURE 2 is carried out, the conditions being generally similar to those set forth in Example I. A hydrorefining catalyst comprising 20% molybdenum disulfide on bauxite is employed in the hydrorefining operation, wherein the temperature is about 600° F., the pressure about 400 p.s.i.g. and the liquid hourly space velocity about 2. After about 10,000 barrels of oil per ton of catalyst have been hydrorefined, a reactivation operation as described in Example I is performed to reduce the sodium content of the hydrogenation catalyst and reactivate the latter for hydrorefining of additional amounts of oil.

The process of the invention is applicable to solid granular adsorbent materials generally, such materials being well known as a class for the treatment of petroleum hydrocarbons. Clay, bauxite, silica-alumina composites, silica gel, kieselguhr, fuller's earth, etc. are examples of such materials. In the case of hydrogenation catalyst, the adsorbent materials are associated in a manner well known in the art with various metals having hydrogenation activity, e.g. nickel, cobalt, molybdenum, platinum, etc. Any of the other known hydrogenation catalysts containing adsorbent material can be treated according to the process of the invention.

The naphthenic acids employed according to the invention preferably have average molecular weight of at least about 200. They generally comprise a mixture of constituents varying in molecular weight by at least 50 units.

The treatment of adsorbent with naphthenic acids according to the invention is preferably performed in the presence of a less viscous diluent, e.g. light hydrocarbons such as pentane, naphtha, etc., or heavier hydrocarbons such as petroleum lubricating oil, or mixture of light and heavy hydrocarbons as in the preceding example. Any suitable known diluent for naphthenic acids can be employed.

The washing of alkali metal naphthenates from the treated adsorbent is preferably accomplished by means of the naphthenic acid containing treating agent itself, the contacting being continued long enough to provide the desired removal of alkali metal compounds. However, separate and subsequent treatments, preferably at temperature within the approximate range from room temperature to 300° F., with other materials, e.g. hydrocarbons, aqueous alcohol, etc. can be employed if desired.

The invention claimed is:

1. In a process for removing naphthenic acids from hydrocarbons which comprises contacting in a refining zone hydrocarbon vapors containing naphthenic acids with a liquid alkaline material to react the naphthenic acids with alkali and produce alkali metal naphthenates in the liquid alkaline material, removing the liquid alkaline material from the refining zone, contacting the removed material with mineral acid to liberate naphthenic acids, separating the liberated naphthenic acids from the aqueous alkaline material, removing hydrocarbon vapors containing a small amount of entrained alkali metal naphthenates from the refining zone, condensing hydrocarbon oil from the removed vapors in a rectifying zone, and contacting the resulting oil with a solid adsorbent at a temperature in the range from 400 to 700° F. to remove alkali metal naphthenates, the improvement which comprises increasing the life of the solid adsorbent by periodically terminating contact thereof with the oil from said rectifying zone and contacting the solid adsorbent at a temperature below 300° F. with the naphthenic acids recovered from said liquid alkaline material and with a hydrocarbon solvent, thereby to remove alkali metal compounds from the adsorbent.

2. The process of claim 1 wherein said adsorbent is bauxite.

3. The process of claim 1 wherein said adsorbent contains a metallic hydrogenation catalyst.

References Cited in the file of this patent
UNITED STATES PATENTS

| | | |
|---|---|---|
| 968,092 | Sulzberger | Aug. 23, 1910 |
| 1,022,347 | Wilbuschewitsch | Apr. 2, 1912 |
| 1,132,054 | Welsh | Mar. 16, 1915 |
| 2,390,272 | Riesmeyer et al. | Dec. 4, 1945 |
| 2,730,506 | Sommer | Jan. 10, 1956 |
| 2,816,933 | Mertzweiller | Dec. 17, 1957 |